United States Patent [19]

Zweigle et al.

[11] 4,172,066

[45] * Oct. 23, 1979

[54] CROSS-LINKED, WATER-SWELLABLE POLYMER MICROGELS

[75] Inventors: Maurice L. Zweigle; Jack C. Lamphere, both of Midland, Mich.

[73] Assignee: The Dow Chemical Company, Midland, Mich.

[*] Notice: The portion of the term of this patent subsequent to Nov. 22, 1994, has been disclaimed.

[21] Appl. No.: 836,875

[22] Filed: Sep. 26, 1977

Related U.S. Application Data

[63] Continuation-in-part of Ser. No. 625,297, Oct. 23, 1975, Pat. No. 4,059,552, which is a continuation-in-part of Ser. No. 481,598, Jun. 21, 1974, abandoned.

[51] Int. Cl.² .................. C08L 3/302; C08L 33/26; C08L 41/00
[52] U.S. Cl. .................. 260/29.6 TA; 128/284; 166/275; 252/8.5 R; 252/8.55 R; 252/8.55 D; 260/29.6 H; 260/29.6 PM; 260/29.6 RW; 526/303; 526/306; 525/336

[58] Field of Search .................. 260/29.6 H, 29.6 TA, 260/29.6 PM, 72 R; 166/275

[56] References Cited

U.S. PATENT DOCUMENTS

| | | | |
|---|---|---|---|
| Re. 26,934 | 8/1970 | Mosbach | 260/29.6 |
| 2,205,355 | 6/1940 | Grimm et al. | 149/6 |
| 2,982,749 | 5/1961 | Friedrich et al. | 260/23 |
| 3,104,231 | 9/1963 | Fitch | 260/29.7 |
| 3,247,171 | 4/1966 | Walker et al. | 260/80.3 |
| 3,252,904 | 5/1966 | Carpenter | 252/8.55 |
| 3,284,393 | 11/1966 | Vanderhof et al. | 260/29.6 |
| 3,539,535 | 11/1970 | Wisner | 260/72 |
| 4,059,552 | 11/1977 | Zwelove et al. | 260/29.6 TA |

*Primary Examiner*—Stanford M. Levin

[57] ABSTRACT

Discrete, spheroidal microgels of a water-swollen or water-swellable, cross-linked polymer such as cross-linked polyacrylamide are particularly useful as thickening agents for aqueous dispersions to be subjected to high shear and as agents for reducing the permeability of porous structures.

10 Claims, No Drawings

CROSS-LINKED, WATER-SWELLABLE POLYMER MICROGELS

CROSS-REFERENCE TO RELATED APPLICATIONS

This application is a continuation-in-part of application Ser. No. 625,297 filed Oct. 23, 1975, now U.S. Pat. No. 4,059,552, which is in turn a continuation-in-part of application Ser. No. 481,598 filed June 21, 1974, now abandoned.

BACKGROUND OF THE INVENTION

This invention relates to water-swellable polymer microgels and to methods for their use.

It has been known for some time to employ water-soluble polymers such as polyacrylamide as thickening agents, e.g., as taught in *Encyclopedia of Polymer Science and Technology*, Interscience Publishers, Vol. 1, 192 (1964), and as agents for restricting the flow of liquids through subterranean formations, e.g., as taught in U.S. Pat. No. 3,039,529.

Normally such polymers which are generally linear are advantageously prepared by a microdisperse polymerization technique such as described in U.S. Pat. Nos. 3,284,393 and 2,982,749. Unfortunately, these linear polymers exhibit virtually no gel strength, i.e., do not resist viscosity changes as a result of mechanical working or milling. As a result, when such polymers are subjected to the high shearing action that is common to many applications wherein such polymers are used as thickening agents or as agents for restricting the flow of liquids through pore structures, they undergo substantial degradation in molecular weight, thereby impairing most of their desirable properties.

Attempts to improve the gel strength of such polymers via cross-linking such polymers as shown in U.S. Pat. No. 3,247,171 have not been very successful. Accordingly, heretofore in order to obtain the desired increase in viscosity or fluid mobility control with the aforementioned polymers, it has been necessary to employ rather low shearing, mixing or pumping apparatus in the desired applications. Such low shearing apparatus are generally less economical and more time consuming to employ.

In view of the aforementioned shear sensitivity of the aforementioned water-soluble, linear polymers and water-swellable, cross-linked polymers, it would be highly desirable to provide a polymer capable of imparting substantial viscosity to an aqueous medium but which will resist degradation when such aqueous medium is subjected to the high shear common to many mixing and pumping apparatus.

SUMMARY OF THE INVENTION

The present invention is such a shear resistant, viscosity-enhancing polymer which exists in the form of discrete, spheroidal microgels of a water-swellable or water-swollen, cross-linked polymer. The microgels have partly or totally water-swollen diameters which are generally within the range from about 0.5 to about 200 micrometers. The microgels, when dispersed in water or other aqueous media, exist in discrete, spheroidal, water-swollen particles which can be separated from the aqueous media by filtration or similar technique.

These novel high molecular weight polymer microgels, although highly water-swellable, are substantially insensitive to mechanical shearing in aqueous media. Consequently, such microgels can be used for a variety of applications wherein high mechanical working, milling or high shear pumping of an aqueous medium containing the microgels is required. Unlike high molecular weight polymers currently available which thicken aqueous solutions but which also give solutions which are stringy, the microgels of this invention are effective thickening agents which, when dispersed in an aqueous medium, exhibit pseudoplastic rheology and short solution characteristics. By "short solution" characteristics is meant that an aqueous medium containing the microgels does not produce threads or strings of such aqueous medium when two surfaces wetted with the medium are contacted and pulled apart.

Because of their uniform small particle size and their ability to absorb substantial proportions of water, the microgels are particularly suited for applications requiring thickening agents, applications requiring rapid sorption of aqueous fluids, e.g., sanitary articles such as diapers, belt pads and the like, and for applications wherein the swelling or partial plugging properties of the polymer are particularly important, e.g., in the plugging of porous formations or structures.

Of particular interest are the applications involving the use of such microgels in enhanced oil recovery operations wherein a drive fluid is introduced through a bore hole in the earth into a porous subterranean formation penetrated by said bore hole, thereby driving the oil from oil bearing structures toward a producing well. In addition, fluid media containing the microgels are usefully employed as the fluid in well drilling operations, as packer fluids in well completion operations and as mobility control fluids in other enhanced oil recovery operations. It is further observed that fluid media containing the microgels are very useful in the treatment of subterranean structures containing substantial amounts of salt water or brine which normally hinder the application of conventional polymeric treating agents.

DETAILED DESCRIPTION OF THE EMBODIMENTS

The microgels of the present invention are generally characterized as discrete, well defined spheroids that are water-swellable and/or water-swollen. In their water-swollen or at least partially water-swollen state, the microgels comprise water and a cross-linked polymer of a water-soluble, ethylenically unsaturated monomer.

In the dry state, the microgels exist as microbeads having diameters generally less than 20 micrometers, preferably less than about 4 micrometers and most preferably less than about 1 micrometer. In their partly or totally water-swollen state, the particle sizes of the microgels can range from about 0.5 to about 200 micrometers, preferably from about 1 to about 10 micrometers. In their partly water-swollen (preinversion) state, the microgels are water-swellable and contain at least 30 weight percent of cross-linked polymer and up to about 70 weight percent of water. In their totally water-swollen (postinversion) state, the microgels contain up to about 99.9 weight percent of water and as little as about 0.1 weight percent of cross-linked polymer. The microgels, when dispersed in a fluid aqueous medium such as water, can be subjected to a substantial amount of high shear, e.g., greater than 500 sec$^{-1}$, without undergoing substantial degradation, i.e., loss of particle size or capacity to hold water (often called gel capacity). Such high shear is characteristic of colloidal mixing employed in preparing relatively high viscosity coating formulations and the pumping action existing in many enhanced oil recovery operations.

Ethylenically unsaturated monomers suitable for use in preparing the microgels are those which are sufficiently water-soluble to form at least 5 weight percent solutions when dissolved in water and which readily undergo addition polymerization to form polymers which are at least inherently water-dispersible and preferably water-soluble. By "inherently water-dispersible", it is meant that the polymer when contacted with an aqueous medium will disperse therein without the aid of surfactants to form a colloidal dispersion of the polymer in the aqueous medium. Exemplary monomers include the water-soluble ethylenically unsaturated amides such as acrylamide, methacrylamide and fumaramide; N-substituted ethylenically unsaturated amides such as N-substituted-(N',N'-dialkylaminoalkyl)acrylamides, e.g., N-(dimethylaminomethyl)acrylamide and N-(diethylaminomethyl)methacrylamide and quaternized derivatives thereof, e.g., N-(trimethylammoniummethyl)acrylamide chloride; ethylenically unsaturated carboxylic acids such as acrylic acid, methacrylic acid, itaconic acid, fumaric acid and the like; ethylenically unsaturated quaternary ammonium compounds such as vinylbenzyltrimethylammonium chloride; sulfoalkyl esters of carboxylic acids such as 2-sulfoethyl methacrylate and the alkali metal and ammonium salts thereof; aminoalkyl esters of unsaturated carboxylic acids such as 2-aminoethyl methacrylate; vinylaryl sulfonates such as vinylbenzene sulfonates including the alkali metal and ammonium salts thereof and the like.

Of the foregoing water-soluble monomers, acrylamide, methacrylamide and combinations thereof with acrylic acid or methacrylic acid are preferred, with acrylamide and combinations thereof with up to 70 weight percent of acrylic acid being more preferred. Most preferred are the copolymers of acrylamide with from about 5 to about 40, especially from about 15 to about 30, weight percent of acrylic acid. The particle size of the microgels of these most preferred copolymers is more easily controlled than are the acid-free copolymers. For example, the addition of polyvalent metal ions such as calcium, magnesium and the like to aqueous compositions containing the most preferred microgels reduces the particle sizes of microgels by a highly predictable amount.

In the most preferred embodiments, it is desirable that the total monomer mixture contain a relatively small proportion (i.e., an amount sufficient to cross-link the polymer, thereby converting the polymer to a non-linear polymeric microgel without appreciably reducing water swellability characteristics of the polymer) of a copolymerizable polyethylenic monomer. Exemplary suitable comonomeric cross-linking agents include divinylarylsulfonates such as divinylbenzenesulfonate, diethylenically unsaturated diesters including alkylene glycol diacrylates and dimethacrylates such as ethylene glycol diacrylate, ethylene glycol methacrylate and propylene glycol diacrylate; ethylenically unsaturated esters of ethylenically unsaturated carboxylic acids such as allyl acrylate; diethylenically unsaturated ethers such as diallyl ethylene glycol ether, divinyl ether, diallyl ether, divinyl ether of ethylene glycol, divinyl ether of diethylene glycol, divinyl ether of triethylene glycol; N,N'-alkylidene-bis(ethylenically unsaturated amides) such as N,N'-methylene-bis(acrylamide), N,N'-methylene-bis(methacrylamide), and other lower alkylidene-bis(ethylenically unsaturated amides) wherein the alkylidene group has from 1 to 4 carbons. When a cross-linking comonomer is the means employed to provide the necessary cross-linking, any amount of such cross-linking comonomer in the monomer mixture is suitable provided that it is sufficient to cross-link the polymer to form a discrete, spheroidal, water-swellable microgel as defined herein. Generally, the concentration of cross-linking comonomer, particularly when the comonomer is a methylene-bis(acrylamide), is in the range from about 5 to about 5,000 weight parts of cross-linking comonomer per million weight parts of total monomers. Preferably, however, good results have been achieved when the cross-linking agent is employed in concentrations from about 5 to about 200, more preferably from about 10 to about 100 parts, by weight of cross-linking agent per million weight parts of total monomers.

The microgels are advantageously prepared by microdisperse solution polymerization techniques, e.g., the water-in-oil polymerization method described in U.S. Pat. No. 3,284,393 which is hereby incorporated in reference in its entirety. In the practice of this method, a water-in-oil emulsifying agent is dissolved in the oil phase while a free radical initiator, when one is used, is dissolved in the oil or monomer (aqueous) phase, depending on whether an oil or water-soluble initiator is used. The weight ratio of the aqueous phase containing the monomer(s) to the oil phase may vary from about 0.1:1 to about 4:1, preferably from about 1:1 to about 3:1. An aqueous solution of monomer or mixed monomers or a monomer per se is added to the oil phase with agitation until the monomer phase is emulsified in the oil phase. Usually the agitation is sufficient to provide disperse aqueous globules having diameters in the range from about 0.5 to about 100 micrometers, preferably from about 1 to about 50 micrometers. In cases where a cross-linking comonomer is employed, the cross-linking comonomer is added along with the other monomer(s) to the oil phase. The reaction is initiated by purging the reaction medium of inhibitory oxygen and continued with agitation until conversion is substantially complete. The product obtained has the general appearance of a polymeric latex. When it is desirable to recover the microgel in essentially dry form, the polymer microgel is readily separated from the reaction medium by adding a flocculating agent and filtering and then washing and drying the microgel. Alternatively, and preferably, the water-in-oil emulsion reaction product is suitably employed as is.

A suitable, but less preferred, method for preparing the microgels is a microsuspension method wherein aqueous solutions of the monomers are suspended in an oil phase and then subjected to conditions of free radical suspension polymerization. In such method the concentration of monomer in the aqueous solution can be varied over a wide range, for example, from about 5 to about 80 weight percent of monomer in the aqueous solution, preferably from about 20 to about 40 weight percent. The choice of a particular monomer concentration depends in large part upon the particular monomer being employed as well as the polymerization temperature. The ratio of the aqueous solution of monomer to the oil phase is also widely variable, advantageously from about 5 to about 75 weight parts of aqueous phase to correspondingly from about 95 to about 25 weight parts of oil phase. The suspending agent suitably employed as a solid or liquid substance having a low hydrophile-lipophile balance, i.e., preponderantly hydrophobic. Exemplary suitable suspending agents are described in U.S. Pat. No. 2,982,749. A preferred suspending agent is an organic polymer which, while predominantly hydrophobic, has hydrophilic substituents such as amine, sulfone, sulfonate, carboxy, and the like. The suspending agent should be employed in an amount sufficient to assure the desired particle size of the resultant microgel, preferably from about 0.4 to about 1 weight percent, based on the weight of the aqueous phase. Exemplary preferred suspending agents include silanized silica, ethyl cellulose and the like. In order to insure that microgels having the desired particle size are obtained, it is often desirable to subject the water-in-oil suspension to high rates of shear.

In either process, the oil phase can be any inert hydrophobic liquid which (1) does not take part in the polymerization reaction and (2) can be separated readily from the polymeric product. Of such liquids the hydrocarbons and chlorinated hydrocarbons such as toluene, xylene, o-dichlorobenzene, ethyl benzene, liquid paraffins having from 8 to 12 carbons, monochlorobenzene, propylene dichloride, carbon tetrachloride, 1,1,1-trichloroethane, tetrachloroethylene, methylene chloride, etc., are advantageously employed, with liquid paraffins, toluene, xylene and the chlorinated hydrocarbons being preferred.

Polymerization initiators suitably employed in either the suspension or emulsion polymerization techniques include peroxygen catalysts such as t-butylhydroperoxide, dimethanesulfonyl peroxide and redox systems such as t-butyl hydroperoxide or alkali metal or ammonium persulfates in combination with usual reducing agents such as sulfite or bisulfite. Alternatively, any free radical generating means can be suitably employed, for example, those generated in situ by ultraviolet or X-rays and the like.

In addition to the employment of a cross-linking monomer as a means for forming the desired polymer microgel, other cross-linking techniques are also suitable. For example, the polymer in dispersed particulate form may be cross-linked subsequent to polymerization by treatment with a chemical cross-linking agent for the polymer such as bleach or similar alkali metal hypohalite or aldehydes such as formaldehyde and dialdehyde, e.g., glyoxal, when the polymer is one bearing pendant amide groups.

In addition, it is sometimes desirable to convert the polymer microgel to a product that has substituted cationic character such as the N-aminomethyl form (Mannich form) of polyacrylamide, or to a polycation such as the quaternized derivative of the Mannich derivative of polyacrylamide. For example, in the preparation of polymer having cationic characteristics, the polymer microgel may be reacted with formaldehyde and an amine to produce the polymer in a manner as disclosed in U.S. Pat. No. 3,539,535. Alternatively, the cationic Mannich polymer microgel can be made by polymerization of cationic Mannich derivative of acrylamide and then homopolymerized or copolymerized with acrylamide or other suitable comonomer. The polycation may be formed by reacting the microgel of the Mannich derivative of polyacrylamide with an alkyl halide and thereby quaternize the amine nitrogen, for example, as described in the procedure in U.S. Pat. No. 3,897,333. Also it may be desirable to hydrolyze some of the amide moieties of acrylamide polymer microgels to acid form by treatment with a hydrolyzing agent such as sodium hydroxide.

In using the cross-linked microgels as thickening agents, it is generally desirable to assure that the microgels are rapidly and thoroughly dispersed throughout the aqueous medium in which thickening is desired. Thus, for example, in employing the microgels to thicken a styrene/butadiene copolymer latex for use in paper coating, it has been found that direct introduction of the dry, solid microgels into the latex may cause lumping or even coagulation. In practice, it is therefore desirable to disperse the microgels in a fluid medium as in the case of a water-in-oil emulsion which is relatively inert to the latex before introducing microgels into the latex. For example, a water-in-oil emulsion of the microgels can be thoroughly mixed with a finely divided mineral pigment, such as calcium carbonate or titanium dioxide, employed in such coating compositions and the resulting mixture be rapidly dispersed in the latex. Alternatively, the microbeads may be dispersed in a water-miscible liquid in which the beads are not swelled appreciably and then rapidly dispersed in the aqueous medium to be thickened. For example, the microgels prepared as in Example 1 hereinafter, can be moistened with methanol and dispersed in tripropylene glycol to produce a slurry containing 30 weight percent of the microgels. Sufficient of this slurry is then dispersed in the latex composition to provide at least about 0.1 weight percent of the microgel based on the total of available water remaining in the latex composition, thereby producing a composition having a viscosity of greater than 6,000 centipoises and suitable for use as a carpet backing.

Generally, in the thickening applications, the microgels are employed in amounts sufficient to give viscosity suitable for the end use desired. Because such viscosities vary with the different end uses and because quantity of microgel needed to produce a particular viscosity will vary with the gel capacity of a particular microgel as well as a concentration of ions in the aqueous medium to be thickened, specific numerical limits of the amounts of microgel to be used in all systems cannot be specified. However, in an aqueous composition having very low ion concentration, microgels which have normal gel capacities are usually employed in concentrations from about 0.1 to about 2 weight parts, preferably from about 0.1 to about 1 weight part, per hundred weight parts of available water. For the purposes of this invention, the term "available water" is defined as that water which is not, in some way, bound to or coordinated with the polymer or additives present in the system. Thus, available water is water available for thickening and provides fluid viscosity to the slurry. It should be noted that the gel capacity of the water-swellable microgels varies with the ionic strength of the aqueous medium to be thickened. Thus, a given sample of beads may sorb 5 to 10 times as much deionized water as they will when dispersed in a salt solution. In an aqueous 0.27 molar sodium chloride solution, the preferred microgels have gel capacities of at least 10, preferably at least 50, grams of solution per gram of polymer. In such salt solutions the microgels often exhibit gel capacities up to about 120 grams of solution per gram of polymer whereas in distilled water, the same microgels may exhibit gel capacities up to about 2,500–3,000 grams of water per gram of polymer.

In the practice of employing the aforementioned microgels in a process for controlling the permeability of a porous structure such as, for example, plugging a porous structure in a subterranean formation, it is desirable to disperse the microgels in a fluid medium, preferably water or a water-in-oil emulsion, such that the resulting dispersion is reasonably stable. The concentration of the microgels in the fluid medium is suitably any concentration that affects the desired control of permeability of the treated formation. In this application, it is desirable to minimize the viscosity of the fluid medium containing the microgels and thereby reduce the amount of energy required to pump the fluid medium into the porous structure. Accordingly, it is desirable to dilute the microgel in the fluid medium as much as possible prior to its introduction into the porous structure. In preferred embodiments utilized for fluid mobility control and enhanced oil recovery, it is desirable that the concentration of the microgels in the fluid medium be in the range from about 100 to about 50,000 parts per million of dry polymer based on the total weight of the fluid medium, more preferably from about 250 to about 10,000 parts per million, most preferably from 250 to about 5,000 parts per million.

While the particle size of the microgels for such permeability control applications is not particularly critical, it is found that the microgels are most advantageously employed in porous structures that are generally free of large fractures or vugs that are more than 10 times the diameter of the swollen microgel and preferably is free of vugs that are about 5 times or more in size than the diameter of the swollen microgel. In most preferred embodiments, it is desirable to employ microgels having diameters that are from about one-third to about the same size as the average pore size of the porous formation. In selecting the microgel, it should be understood that it is the particle size that the microgel will possess in the pore subterranean structure to be treated that is significant. Accordingly, the gel capacity of the microgel as well as its sensitivity to ion concentration which may exist in the pore structure, e.g., brines that exist in many oil bearing subterranean formations, are important.

The fluid medium used to carry the microgels into the porous structure is suitably any fluid medium which does not substantially inhibit the water-swelling characteristics of the microgels. Most commonly, the fluid medium is an aqueous liquid which may contain a variety of other ingredients such as salts, surfactants, bases such as caustic and other additaments commonly employed in controlling the permeability of pore structures.

In light of their desirable utility for controlling the mobility of liquids through pore structures, the microgels of the present invention are very advantageously employed in enhanced oil recovery operations wherein a drive fluid is introduced through a bore hole in the earth into a pore subterranean formation penetrated by said bore hole, thereby driving oil from oil bearing structures toward a producing well. In addition, fluid media containing the microgels are also usefully employed as the fluid in well drilling operation, as packer fluids in well completion operations and as mobility control fluids in other enhanced oil recovery operations. The microgels of the present invention are particularly effective for decreasing the mobility of the drive fluid, such as water or other fluids, or decreasing the permeability of non-fractured porous formations prior to or during enhanced oil recovery operations which involve the use of driving fluids. The microgels are also useful for water shut-off treatments in production wells in which the fluid medium containing the microgels can be injected into the formation prior to or subsequent to the injection of another fluid. Moreover, the microgels may be employed in oil recovery operations wherein a dry fluid breaks through into the production well excessive amounts. At such time the microgels dispersed in the fluid medium are then pumped into the well through which the drive fluid is being supplied and into the pore formation until the desired decrease in mobility of the drive fluid through such pore formation is obtained.

The following examples are given to illustrate the invention and should not be used to limit its scope. Unless otherwise indicated, all parts and percentages are by weight.

EXAMPLE 1

Cross-linked acrylamide-sodium acrylate copolymer

168 Grams of acrylamide, 42 grams of acrylic acid, 63 grams of $Na_2CO_3$, 0.21 gram of pentasodium (carboxymethylimino)bis(ethylene-nitrilo)tetraacetic acid (Versenex 80), 0.042 gram of methylene-bisacrylamide, 0.105 gram of sodium metabisulfite and 0.105 gram of tertiary butyl hydroperoxide are dissolved in 1050 grams of deionized water and sufficient sodium hydroxide added thereto to bring the mixture to a pH of 9.5. The resulting solution is mixed with an oil phase consisting of 31.5 grams of acrylic acid and 6.3 grams of a suspending agent consisting of a chloromethylated polystyrene-dimethylamine reaction product, wherein about 5–10 percent of the aromatic rings are aminated, dissolved in 1575 milliliters of xylene. The resulting mixture is sheared at high speed in a Waring Blendor for two minutes, placed in an agitated reactor and purged with nitrogen. The temperature of the reaction vessel and contents is raised to 63° C. over a period of one hour and thereafter held at about 52° C. for an additional 2.5 hours to complete the polymerization reaction. A portion of the resulting slurry is then dewatered by azeotropic distillation and the resulting suspension filtered to separate the copolymer in the form of microgels. The latter are washed with acetone and dried. The ability of the microgels to swell in aqueous fluid is measured and it is found that the copolymer held 82 grams of aqueous 0.27 molar sodium chloride solution per gram of copolymer. To a further 55 gram portion of the above copolymer slurry are added 27.7 milliliters of dimethylamine and then 14.8 grams of paraformaldehyde slurried in a little xylene. The resulting mixture is heated to 40° C. for 1.5 hours, filtered, and dried by acetone extraction to give cationic, cross-linked polyacrylamide microgels, ranging in size between 0.2 and 4 microns in diameter. The product absorbs 50 grams of aqueous 0.27 M NaCl solution per gram of product. The grams of aqueous fluid absorbed and held by one gram of dry polymer beads (dried gels) is herein referred to as the "gel capacity" of the polymer. The product upon being uniformly dispersed in water, quickly thickens the water to give a viscous, "short", pseudoplastic dispersion.

In the above and succeeding recipes "Versenex 80" is a trademark of The Dow Chemical Company for a chelating agent in which the active chelant is pentasodium (carboxymethylimino)bis(ethylenenitrilo)tetraacetic acid. Also the expression "ppm BOM" is hereafter employed to denote parts per million based on monomers; that is, parts by weight of the indicated ingredient per million parts by weight of water-soluble, ethylenically unsaturated monomers in the recipe. Hereinafter tertiary-butyl hydroperoxide is abbreviated "t-BHP".

EXAMPLE 2

Cross-linked polyacrylamide microgel

Recipe:

| Water Phase | |
|---|---|
| Acrylamide | 210 g |
| Methylene bisacrylamide | .042 g |
| Versenex 80 Chelant | 1000 ppm BOM |
| NaOH to pH 11.5 | |
| Water | 840 g |
| Na$_2$S$_2$O$_8$ | 500 ppm BOM |
| t-BHP | 500 ppm BOM |
| Oil Phase | |
| Xylene | 1575 ml |
| Aminated Chloromethylated Polystyrene | 6.3 g |
| Methanol | 20 ml |

The process is similar to that of the previous example. The product is dewatered by azeotropic distillation, separated by filtration, washed with acetone and dried. It is found to have a gel capacity of 30 in aqueous 0.27 M NaCl solution.

EXAMPLE 3

Cross-linked partially hydrolyzed polyacrylamide microgel

Recipe:

| Water Phase | |
|---|---|
| Acrylamide | 106 g |
| Methylene bisacrylamide | .025 g |
| Water | 463 g |
| Na$_2$CO$_3$ | 61.3 g |
| Versenex 80 Chelant | 1000 ppm BOM |
| Na$_2$S$_2$O$_8$ | 500 ppm BOM |
| t-BHP | 500 ppm BOM |
| Oil Phase | |
| Xylene | 945 ml |
| Suspending Agent of Ex. 2 | 3.78 g |
| Acrylic Acid | 20 g |

The process is similar to that of the previous examples. The product exhibits similar properties and has a gel capacity of 75 in aqueous 0.27 M NaCl solution.

EXAMPLE 4

Emulsion method

When the emulsion route is used to make the microgels, the ratio of monomer phase (liquid monomer or aqueous solution of monomer) to oil phase, the emulsifying agents, the oil phase, the initiators, temperatures and pressures are all generally found in U.S. Pat. No. 3,284,393 or in U.S. Pat. No. 3,826,771. The cross-linking agents described above in connection with the suspension method can be similarly advantageously used herein.

In this example, the water-in-oil emulsifying agent is dissolved in the oil phase, while the free radical initiator, when one is used, is dissolved in the oil or monomer phase, depending upon whether an oil- or water-soluble initiator is used. An aqueous solution of monomer or mixed monomers or a monomer per se is then added to the oil phase along with the cross-linking agent with agitation until the monomer phase is emulsified in the oil phase. The reaction is initiated by purging the reaction medium of inhibitory oxygen and purged with agitation until conversion is substantially complete. A water-in-oil dispersion of polymer microgels is thereby obtained. The polymer is separated from the reaction medium advantageously by adding a flocculating agent and filtering, and is then washed and dried. Alternatively, the dispersion can be used as such.

Recipe:

| Ingredients | Amount |
|---|---|
| Aqueous Phase | |
| Acrylamide | 525 g |
| Acrylic Acid | 225 g |
| NaOH | 120 g |
| Deionized water | 695 g |
| Methylene bisacrylamide | 0.150 g |
| Versenex 80 | 1000 ppm BOM |
| t-BHP | 350 ppm BOM |
| Na$_2$S$_2$O$_5$ | 700 ppm BOM |
| Oil Phase | |
| Deodorized kerosene | 1500 g |
| Distearyl dimethyl ammonium chloride (Arquad 2HT-100) | 75 g |

The water phase, less t-BHP and Na$_2$S$_2$O$_5$, is mixed with the oil phase and homogenized in a Manton-Gaulin homogenizer, placed in the reactor, and purged for 45 minutes with nitrogen. t-BHP and Na$_2$S$_2$O$_5$, both as 1.5 percent aqueous solutions, are added portionwise, a third of the total at a time, resulting in polymerization. The product is azeotropically distilled at 40 mm pressure from 40° to 110° C. to remove water and give a product having particle size less than two microns. The microbead polymeric product thickens water instantly on being dispersed in water.

EXAMPLE 5

A. Preparation of the Microgels

To an oil phase consisting of ingredients as listed hereinafter is added an aqueous solution of monomers as also described hereinafter with agitation until the monomer phase is emulsified in the oil phase.

| Ingredients | Amount, grams | |
|---|---|---|
| Aqueous Phase | | |
| Acrylamide | 134.4 | |
| Acrylic acid | 33.6 | |
| Sodium hydroxide | 28.75 | |
| Deionized water | 403.25 | |
| Methylene-bisacrylamide | 0.0047 | (28 ppm) |
| DETPA* | 0.168 | (1000 ppm) |
| t-butyl hydroperoxide | 0.0420 | (250 ppm) |
| Sodium bisulfite | 0.0218 | (130 ppm) |
| Oil Phase | | |
| Deodorized kerosene | 240.3 | |
| Isopropanolamide of oleic acid | 16.8 | |

*Pentasodium salt of diethylenetriamine-pentaacetic acid

In forming the emulsion, the aforementioned aqueous phase (less the t-butyl hydroperoxide and sodium bisulfite) is mixed with the oil phase using controlled high shear, i.e., 30 seconds in a Waring Blendor or Eppenbach Homogenizer. The resulting emulsion is placed in a reactor which is purged for 1 hour with N$_2$. The t-butyl hydroperoxide (20 percent aqueous solution emulsified in oil at a weight ratio of ~3 oil to 5 water) is added to the reactor in a single shot. The sodium bisulfite (2 percent aqueous solution emulsified in oil at a weight ratio of ~3 oil to 5 water) is added portion-wise to the reactor in 10 ppm increments until polymerization of the monomers is completed. After polymerization, the temperature is increased to 60° C. for 2 hours. In a dispersion of the water-swellable microgels in deionized water containing 30 percent polymer, it is observed that the mean particle diameter of the water-swollen microgels is about one micrometer.

B. Water Permeability Reduction Tests

The ability of the microgels to control permeability of porous subterranean formations is determined using a series of Berea sandstone cores according to the following test procedure. In most of the core samples (2.54 cm length × 2.54 cm diameter), the pore volume is from 2.8 to 3.2 ml and the pore size is from about 14 to 16 micrometers. The initial core permeability is determined by pressuring an aqueous solution of NaCl (4%) through the core in forward and reverse directions. The aforementioned microgels are diluted to 0.02% solids by adding deionized water and injected into the core sample at 10 psig. The microgel injection is followed with a brine flow in the forward and reverse direction to establish the permeability reduction. The differential pressure during the brine flow is then increased in 20 psi increments to 60 psi. After each incremental increase, 50 ml of brine is passed through the core sample and the flow rate is determined. The pressure is then returned to the original test pressure of 10 psig and a final brine flow rate is determined after the sample stabilizes (flow rate becomes constant). Comparison of initial and final brine flow rates establish the permeability reduction resulting from the microgel treatment of the core sample. The results for this sample (Sample No. 1) are recorded in Table I.

For the purposes of comparison, several water-soluble (noncross-linked) acrylamide/acrylic acid copolymers (Sample Nos. $C_1$–$C_5$) are similarly tested for water diverting capability. The results of these tests are similarly reported in Table I.

EXAMPLE 6

Following the general procedure for preparing acrylamide/acrylic acid copolymer microgels as specified in Example 5, microgels are prepared using amounts of methylenebis(acrylamide) ranging from 7 to 200 parts per million instead of the 28 parts per million employed in Example 5. Also runs are carried out using polyacrylamide microgels wherein the carboxyl moiety is varied from 5 to 40 mole percent. The resulting microgels are similarly tested for their water diverting capability by the procedure set forth in Example 5 and the results for the samples (Sample Nos. 2–7) are similarly recorded in Table I.

TABLE I

| Sample No. | Polymer Mole % COOH | Polymer ppm MBA (1) | Viscosity, cps (2) | Dry Polymer Concentration, ppm (3) | Permeability (4) Initial, md | Permeability (4) Treated, md Forward | Permeability (4) Treated, md Reverse | Permeability Reduction, % Forward | Permeability Reduction, % Reverse |
|---|---|---|---|---|---|---|---|---|---|
| 1 | 20 | 28 | 2.2 | 2000 | 322 | 3 | 14 | 99.4 | 95.6 |
| 2 | 20 | 100 | 1.4 | 2000 | 357 | 23.1 | 65.7 | 93.2 | 81.6 |
| 3 | 20 | 7 | <5 | 2000 | 212 | 172 | 60 | 19 | 71 |
| 4 | 20 | 14 | " | " | 350 | 12 | 19.6 | 96.5 | 94.4 |
| 5 | 20 | 200 | " | " | 369 | 64 | 89 | 83 | 76 |
| 6 | 5 | 100 | " | " | 435 | 8 | 81 | 98 | 81 |
| 7 | 40 | 100 | " | " | 290 | 9 | 24 | 97 | 92 |
| $C_1$* | 20 | 0 | >5 | " | 468 | 60 | 130 | 87 | 72 |
| $C_2$* | 15–25 | 0 | 6.0 | 1500 | 347 | 286 | 192.6 | 17.5 | 44.5 |
| $C_3$* | 15–25 | 0 | 8.0 | 1500 | 477 | 121 | 95.4 | 77 | 80 |
| $C_4$* | 15 | 0 | 10.6 | 1500 | 108 | 4.6 | 10.8 | 95.6 | 90 |
| $C_5$* | 1 | 0 | >5 | 1900 | 481 | 431 | 408.5 | 25.5 | 15.0 |

*Not an example of the invention
(1) parts per million of methylene-bisacrylamide (cross-linker) based on total monomer
(2) Brookfield viscosity in centipoise at 0.10 percent dry polymer in a 4 percent NaCl aqueous solution at 25° C. using a Brookfield Viscometer (Model LVS) with an UL adapter and operating at 6.6 sec$^{-1}$.
(3) parts per million of dry polymer based on the total aqueous medium used in polymer treatment of the core.
(4) permeability of the core sample in millidarcies (md) using the water diversion test procedure of Example 5.

As evidenced by the data in Table I, the fluid microgel compositions of the present invention exert a generally greater control of the permeability of porous core samples (fluid mobility control) at lower viscosities than do compositions containing linear polymer.

What is claimed is:

1. A composition which comprises discrete, spheroidal microgels of a water-swellable polymer consisting essentially of water-soluble ethylenically unsaturated monomers wherein said microgels in the dry state have diameters less than about 20 micrometers, said polymer being sufficiently cross-linked to enable the microgels to remain as discrete spheroidal particles having diameters in the range from about 0.5 to about 200 micrometers when said microgels are dispersed in an aqueous fluid medium.

2. The composition of claim 1 wherein the cross-linked polymer is a cross-linked polymer of an α,β-ethylenically unsaturated amide or a N-substituted derivative thereof, said microgels when existing in the dry state having diameters less than about 4 micrometers.

3. The composition of claim 1 which comprises the microgels dispersed in an aqueous fluid medium in an amount within the range from about 0.1 to about 2 weight parts of the microgels on a dry basis per hundred weight parts of the composition.

4. The composition of claim 1 wherein the cross-linked polymer is cross-linked with from about 5 to about 5,000 weight parts of a N,N'-alkylidene-bis(ethylenically unsaturated amide) per million weight parts of total monomers of the polymer.

5. The composition of claim 1 wherein the microgels have a gel capacity of at least 10 grams of sodium chloride solution per gram of polymer in an aqueous 0.27 molar sodium chloride solution.

6. The composition of claim 4 wherein the cross-linked polymer is a copolymer of acrylamide and methylene bis(acrylamide).

7. The composition of claim 6 wherein the crosslinked polymer is a copolymer of acrylamide, acrylic acid and methylene bis(acrylamide).

8. A method for reducing the permeability of a porous structure which comprises introducing into the porous structure a fluid medium containing discrete spheroidal microgels of claim 1 in an amount sufficient to reduce the permeability of the porous structure.

9. The composition of claim 3 wherein the polymer has been rendered cationic by reaction with formaldehyde and a dialkyl amine.

10. A viscous short aqueous suspension of the composition of claim 1 containing from about 0.2 to about 2 percent by weight of the microgels and being resistant to viscosity degradation under conditions of high shear.

* * * * *